US008955911B2

(12) United States Patent
Yamada et al.

(10) Patent No.: US 8,955,911 B2
(45) Date of Patent: Feb. 17, 2015

(54) SEAT RECLINING DEVICE FOR VEHICLE (75) Inventors: Yukifumi Yamada, Toyota (JP); Naoki Goto, Tokai (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 14/124,916

(22) PCT Filed: Jun. 11, 2012

(86) PCT No.: PCT/JP2012/064936
§ 371 (c)(1),
(2), (4) Date: Dec. 9, 2013

(87) PCT Pub. No.: WO2012/173098
PCT Pub. Date: Dec. 20, 2012

(65) Prior Publication Data
US 2014/0103693 A1    Apr. 17, 2014

(30) Foreign Application Priority Data
Jun. 14, 2011    (JP) .................................. 2011-132411

(51) Int. Cl.
*B60N 2/235*    (2006.01)
(52) U.S. Cl.
CPC .................................... *B60N 2/2356* (2013.01)
USPC ................. 297/367 P; 297/367 L; 297/367 R
(58) Field of Classification Search
USPC ................. 297/367 P, 367 L, 367 R
See application file for complete search history.

(56) References Cited

U.S. PATENT DOCUMENTS

| 6,325,458 | B1 * | 12/2001 | Rohee et al. | 297/367 R |
| 7,988,233 | B2 * | 8/2011 | Yamada et al. | 297/367 P |
| 8,002,352 | B2 | 8/2011 | Yamada et al. | |
| 8,430,453 | B2 * | 4/2013 | Fujishiro et al. | 297/367 P |
| 8,651,578 | B2 * | 2/2014 | Yamada et al. | 297/367 P |
| 2007/0145800 | A1 | 6/2007 | Thiel et al. | |
| 2011/0001346 | A1 * | 1/2011 | Yamada et al. | 297/367 P |
| 2011/0012414 | A1 * | 1/2011 | Yamada et al. | 297/367 P |
| 2011/0025114 | A1 * | 2/2011 | Berndtson et al. | 297/367 P |
| 2011/0115271 | A1 * | 5/2011 | Yamada et al. | 297/367 P |
| 2011/0254338 | A1 * | 10/2011 | Fisher et al. | 297/367 P |

FOREIGN PATENT DOCUMENTS

| JP | 2002 325645 | 11/2002 |
| JP | 2008 506481 | 3/2008 |
| JP | 2010 22401 | 2/2010 |

OTHER PUBLICATIONS

International Search Report Issued Jul. 3, 2012 in PCT/JP12/064936 Filed Jun. 11, 2012.

* cited by examiner

*Primary Examiner* — Rodney B White
(74) *Attorney, Agent, or Firm* — Oblon, Spivak, McClelland, Maier & Neustadt, L.L.P.

(57) ABSTRACT

A seat reclining device includes a pawl having external teeth, a first arm, a second arm, a cam assembly, and a pressing member. The first arm has a pair of guide walls that guide the pawl in the radial direction. The second arm is rotationally supported by the first arm and has internal teeth. When the cam assembly rotates in a forward direction, the cam assembly presses and moves the pawl radially outward to mesh the external teeth with the internal teeth, and presses the pressing member radially outward. When pressed radially outward, the pressing member presses the pawl in the radial direction and a direction from the guide wall towards the pawl. When the cam assembly rotates in a reverse direction, the cam assembly releases the pressing member and moves the pawl radially inward to separate the external teeth from the internal teeth.

4 Claims, 7 Drawing Sheets

SEAT RECLINING DEVICE FOR VEHICLE

BACKGROUND OF THE INVENTION

The present invention relates to a seat reclining device for a vehicle, which is provided to adjust a tilt angle of a seat back with respect to a seat cushion.

Conventionally, as such a seat reclining device for a vehicle, one described in, for example, Patent Document 1 is known. This seat reclining device for a vehicle includes an upper plate having an internal teeth portion, a lower plate pivotally supporting the upper plate, two pawls the radial movements of which are guided by two pairs of guide walls provided on the lower plate, a cam capable of contacting the radially-inner surfaces of these pawls, and two pressing members capable of contacting the corresponding inner surfaces of the pawls. The cam is capable of contacting the pressing members. Each pawl has external teeth capable of meshing with an internal teeth portion. The external teeth are urged by a spring, via the cam or via the cam and pressing members, in the direction in which these external teeth mesh with the corresponding internal teeth portion. Thus, the external teeth of the pawls are held to mesh with the corresponding internal teeth portions of the upper plate.

Figure 7:
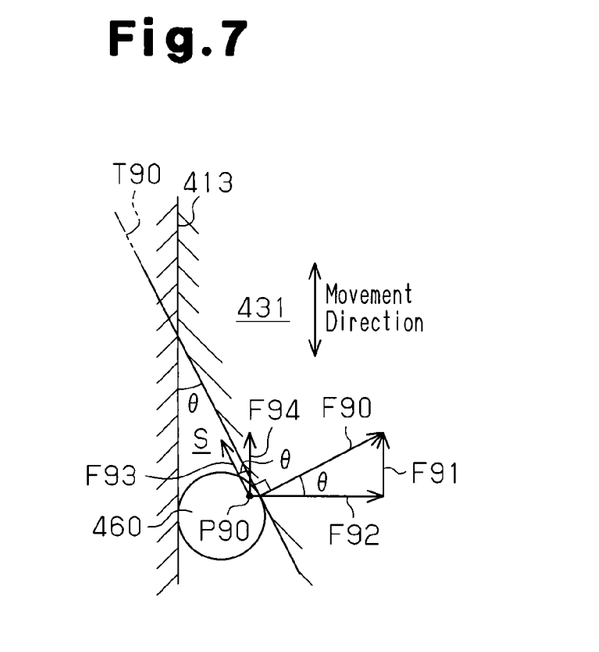
FIG. 7 is an explanatory view showing a meshed state of a conventional seat reclining device.
Figure 8:
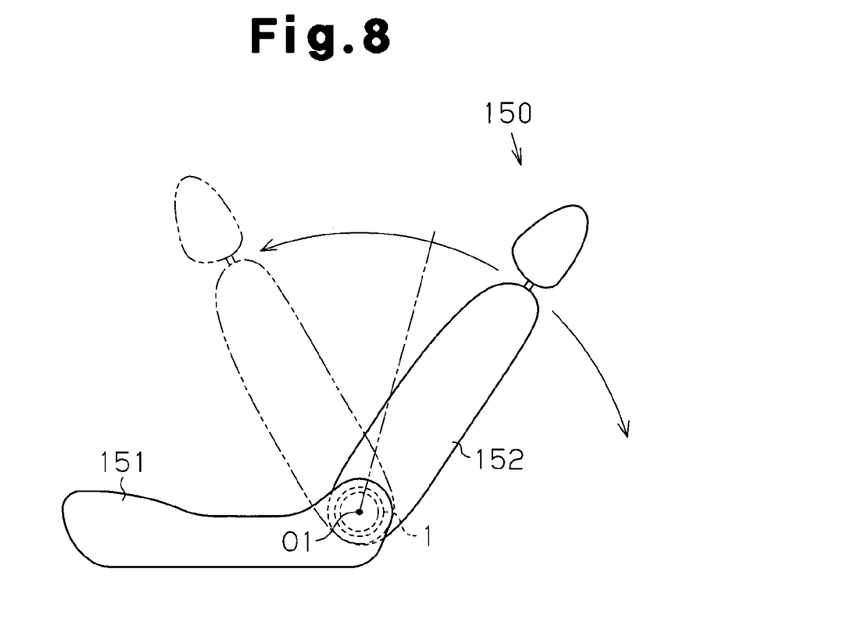
FIG. 8 is a schematic view of a vehicle seat incorporating a seat reclining device according to the present invention.

As shown in FIG. 7, a wedge-shaped space S is formed between the inner surface of a pawl 431, which is located between each pair of guide walls, and one guide wall 413 of each pair of guide walls. The pressing member 460 has a cylindrical shape and is located in the wedge-shaped space S. The pressing member 460 can be pressed from below in FIG. 7 by a cam (not shown). In this case, the pressing force F90 applied to the pawl 431 by the pressing member 460 is oriented substantially in a direction orthogonal to the tangent T90 of the pawl 431 at a pressing point P90, that is, in the direction of a normal line at the pressing point P90. Therefore, the pressing force F90 of the pressing member can be decomposed into a first component force F91 in the moving direction of the pawl and a second component force F92 in a direction orthogonal to the moving direction. The pawl 431 is pressed against the guide wall (not shown) opposite to the guide wall 413 mentioned above, and the gap between the pawl 431 and each guide wall can be filled by the pressing member 460. Thus, backlash of the seat is restricted. This results from the action of the second component force F92 holding the positions of the internal teeth of the upper plate against external force.

The second component force F92 acting on the pawl 431 increases with a decrease in the inclination angle θ in the acting direction of the second component force F92 with respect to the acting direction of the pressing force F90 (the direction of the normal line at the pressing point P90), that is, with a decrease in the inclination angle θ of the tangent T90 with respect to the moving direction of the pawl 431. Accordingly, backlash of the seat can be restricted more firmly.

However, as the second component force F92 acting on the pawl 431 increases, it becomes difficult to detach the pressing member 460 from the inner surface of the pawl 431. This is because the component force F94 of the frictional force F93 based on the pressing force F90 of the pressing member 460 acts to hinder disengagement of the pressing member 460 from the pawl 431, such that the component force F94 increases with a decrease in the inclination angle θ of the tangent T90 with respect to the moving direction of the pawl 431. In order to facilitate such disengagement of the pressing member 460 from the inner surface of the pawl 431, it may be proposed that the inclination angle θ of the tangent T90 with respect to the moving direction of the pawl 431 be increased.

However, in this case, the second component force F92 onto the pawl 431 decreases, resulting in decrease in force holding the position of the internal teeth portion of the upper plate against external force, as described above.

PRIOR ART DOCUMENTS

Patent Documents

Patent Document 1: Japanese Laid-Open Patent Publication No. 2002-325645

SUMMARY OF THE INVENTION

It is an object of the present invention to provide a seat reclining device for a vehicle, the device being designed such that, with external teeth meshed with the internal teeth, the disengagement of the pressing member and the disengagement of the external teeth from the internal teeth can be carried out smoothly, while optimally ensuring the component force of a pressing member acting on a pawl to hold the position of internal teeth against external force.

To achieve the foregoing objective, in accordance with the present invention, a seat reclining device for a vehicle includes a first arm fixed to one of a seat cushion and a seat back, a second arm fixed to the other of the seat cushion and the seat back, at least one pawl, a cam assembly, at least one inclined surface, at least one pressing member, and an urging member. The first arm has at least one pair of opposed guide walls. The second arm is supported by the first arm to be rotational around a rotation axis. The second arm has a plurality of internal teeth formed to protrude inward in a radial direction with the center being the rotation axis. The pawl has a plurality of external teeth formed to protrude outward in the radial direction and capable of meshing with the internal teeth of the second arm. The pawl is arranged between the opposed guide walls and is guided by the guide walls to move in the radial direction. The cam assembly is engaged with the pawl and selectively rotational in forward and reverse directions around the rotation axis. When the cam assembly rotates in the forward direction, the cam assembly presses the pawl to move the pawl outward in the radial direction and to engage the external teeth of the pawl with the internal teeth of the second arm. When the cam assembly rotates in the reverse direction, the cam assembly moves the pawl inward in the radial direction to separate the external teeth of the pawl from the internal teeth of the second arm. The inclined surface is formed in a radially inside area of at least one of the guide walls. The inclined surface is inclined such that the radially inside area of the guide wall deviates from the pawl. The pressing member is arranged between the inclined surface and a radially inner face of the pawl. When the cam assembly rotates in the forward direction, the pressing member is pressed outward in the radial direction by the cam assembly to press the radially inner face of the pawl, and in turn, presses the pawl in a direction from the guide wall that has the inclined surface toward the pawl, and moves the pawl outward in the radial direction. When the cam assembly rotates in the reverse direction, the pressing member is released from pressure from the cam assembly to release pressure on the radially inner face of the pawl, and allows the pawl to move inward in the radial direction. The urging member is configured to urge the cam assembly in the forward direction to move the pawl outward in the radial direction.

BRIEF DESCRIPTION OF THE DRAWINGS

FIG. 1(*a*) is a transverse cross-sectional view of a seat reclining device according to a first embodiment of the present invention;

FIG. 1(b) is a longitudinal cross-sectional view of the seat reclining device according to the first embodiment of the present invention;

DETAIL DESCRIPTION OF THE PREFERRED EMBODIMENTS

First Embodiment

With reference to FIGS. 1 to 3 and 8, a first embodiment of the present invention will be described. As shown in FIGS. 1(a) and 1(b), a seat reclining device 1 for a vehicle includes a disk-like lower arm 10 that acts as a first arm, and a disk-like upper arm 20 that acts as a second arm. The lower arm 10 is fixed to a seat cushion 151 constituting the seat section of the seat 150 for a vehicle, and an upper arm 20 is fixed to a seat back 152 constituting the back rest section of the seat 150 for a vehicle.

The lower arm 10 is formed, for example, by half-blanking a sheet of metal. The lower arm 10 has a recess 11 that is open toward the upper arm 20 and has a circular bottom face. The recess 11 has an internal circumferential surface 11a extending in a circumferential direction with the center being the rotation axis O1 of the lower arm 10 and upper arm 20.

Figure 1:
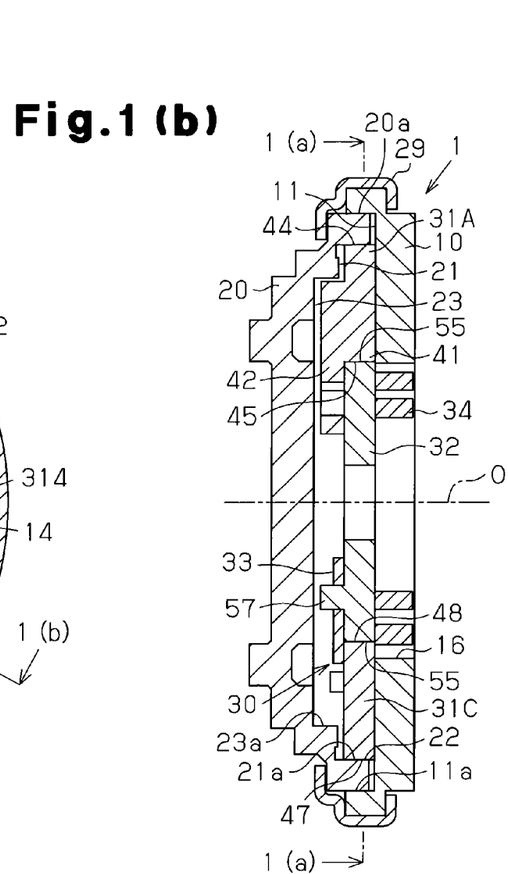
Figure 2:
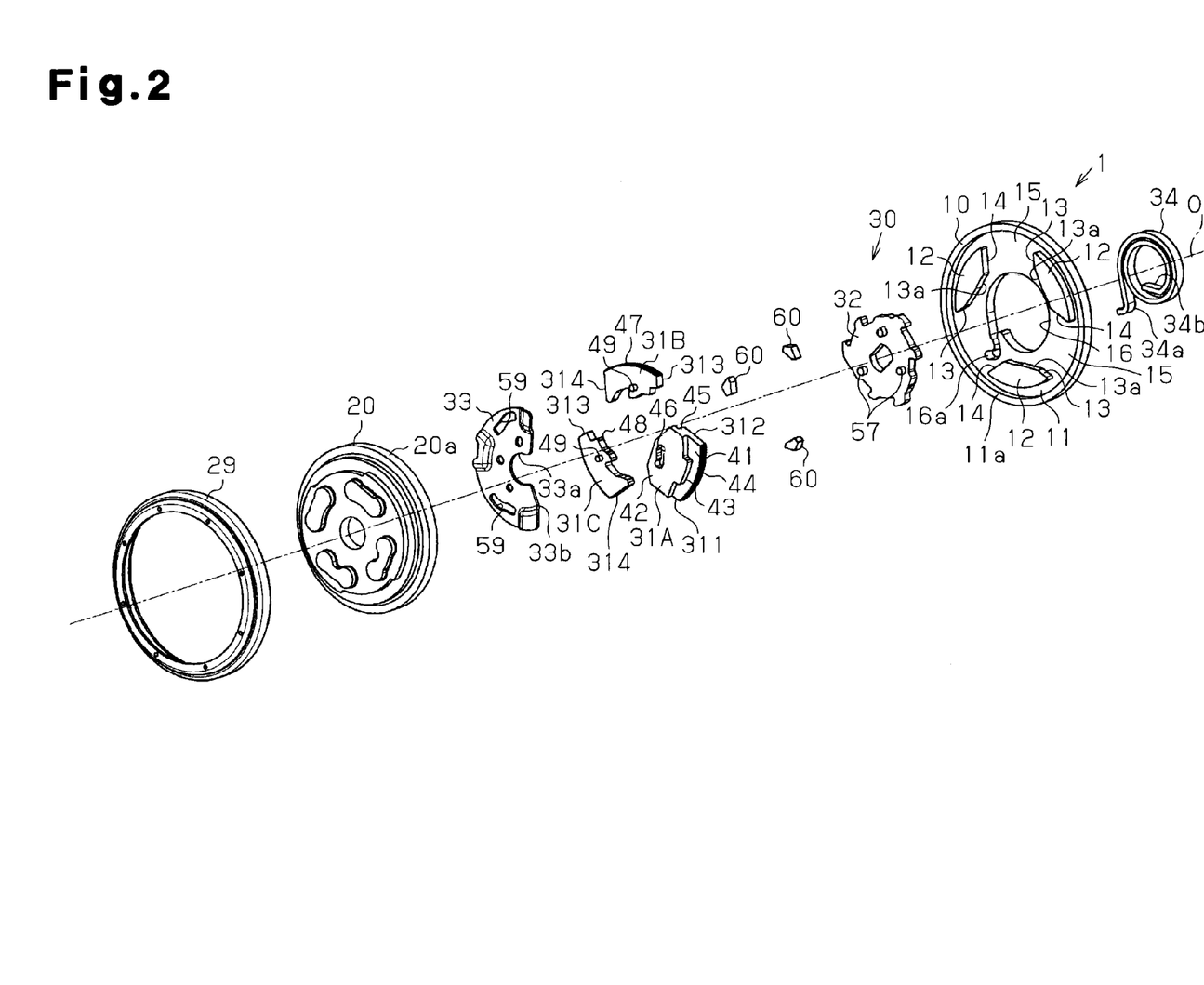
FIG. 2 is an exploded perspective view of the seat reclining device according to the first embodiment.

As shown in FIG. 2, the lower arm 10 has, on the bottom face of the recess 11, three substantially sectorial projections 12 projecting toward the upper arm 20 along the rotation axis O1, which are arranged at equal angular intervals in a circumferential direction. Each projection 12 has a first guide wall 13 and a second guide wall 14 on both sides in the circumferential direction. In FIG. 1(a), the first guide wall 13 is located at the front of each projection 12 in a counterclockwise direction, and a second guide wall 14 is located at the rear of each projection 12 in the counterclockwise direction. In each pair of adjacent projections 12, the first and second guide walls 13 and 14 in an opposite relationship in the circumferential direction with the bottom face of the recess 11 in between extend parallel to each other in a radial direction with the center being the rotation axis O1. Together with the bottom of the recess 11, the first and second guide walls 13 and 14 form three substantially U-shaped guide grooves 15 at equal angular intervals in the circumferential direction, the guide grooves 15 extending in a radial direction with the center being the rotation axis O1. These guide grooves 15 communicate with one another at the central part of the lower arm 10, and substantially form a Y shape as a whole. The first guide wall 13 of each projection 12 has an inclined surface 13a at the radially inside part. The inclined surface 13a of each first guide wall 13 is inclined to deviate radially inward from the corresponding second guide wall 14 that is opposite to the first guide wall 13 with the bottom face of the recess 11 in between.

Additionally, the central part of the lower arm 10, where the three guide grooves 15 communicate with one another, has a substantially circular through hole 16, which is formed through the lower arm 10 along the rotation axis O1. The through hole 16 has a locking groove 16a, which is recessed at a predetermined angle and located on the radially outside of the hole 16.

The upper arm 20 is formed, for example, by half-blanking a sheet of metal. The upper arm 20 has an external circumferential surface 20a with an outer diameter of an equal size to the inner diameter of the internal circumferential surface 11a of the lower arm 10. Additionally, as shown in FIG. 1(b), the upper arm 20 has a recess 21 that is open toward the lower arm 10 and has a circular bottom face. The recess 21 has a first internal circumferential surface 21a extending in a circumferential direction with the center being the rotation axis O1. A plurality of internal teeth 22 is formed along the entire circumference of the first internal circumferential surface 21a of the recess 21. The internal teeth 22 act as a first gear. An additional recess 23 is formed in the bottom face of the recess 21. The additional recess 23 has a circular bottom face concentric with the recess 21, and has a second internal circumferential surface 23a extending in a circumferential direction with the center being the rotation axis O1. As shown in FIG. 1(a), the second internal circumferential surface 23a has two projections 24 at equal angular intervals in the circumferential direction, each projection 24 projecting toward the rotation axis O1 and extending in a substantially arcuate shape along the circumferential direction.

As shown in FIG. 1(b), the upper arm 20 is fit in the lower arm 10 such that its external circumferential surface 20a is in slidable contact with the internal circumferential surface 11a of the lower arm 10. A holder 29 is attached to the peripheral parts of the lower and upper arms 10 and 20, with the internal circumferential surface 11a of the lower arm 10 and the external circumferential surface 20a of the upper arm fitted together. The holder 29 is formed in a ring shape from a sheet of metal. The lower and upper arms 10 and 20 are held by the holder 29 to be allowed to rotate relative to each other and to be prevented from separating along the rotation axis O1.

A locking mechanism 30 is arranged between the lower and upper arms 10 and 20. As shown in FIG. 2, the locking mechanism 30 includes, as its main components, a first pawl 31A, a second pawl 31B, a third pawl 31C, a cam 32, a release plate 33, a spiral spring 34 serving as an urging member, and three pressing members 60. The cam 32 and release plate 33 constitute a cam assembly.

The first to third pawls 31A to 31C are mounted between the first and second guide walls 13 and 14 in the corresponding guide grooves 15 and arranged at equal angular intervals in the circumferential direction with the center being the rotation axis O1.

The first pawl 31A is formed, for example, by casting a steel material. The first pawl 31A includes a first block 41 and a second block 42 connected along the rotation axis O1. The first block 41 of the first pawl 31A is located near the first internal circumferential surface 21a of the upper arm 20, and the second block 42 thereof is located near the second internal circumferential surface 23a of the upper arm 20. The second block extends nearer to the rotation axis O1 than the first block does. Both ends of the first block 41 in the widthwise direction and both ends of the second block 42 in the widthwise direction aligned with each other, thereby forming widthwise ends 311 and 312 of the two blocks. The widthwise ends 311 and 312 are straight lines parallel to each other. The first block 41 has an arcuate outer edge (the edge face opposite to the internal teeth 22 of the upper arm 20). On the outer edge of the first block 41, a plurality of external teeth 44 is formed to engage with the internal teeth 22 of the upper arm 20. The external teeth 44 act as second teeth. The first block 41 has an inner edge (the edge face opposite to the outer edge). On the inner edge of the first block 41, an internal cam part 45 is formed to engage with the peripheral part of the cam 32. Additionally, in the substantially middle of the second block 42 in the widthwise direction, a pawl-side groove cam 46 is formed through the second block 42 along the rotation axis O1.

Both the widthwise ends 311 and 312 of the first pawl 31A are in slidable contact with the first and second guide walls 13 and 14, respectively. The movement of the first pawl 31A is guided by the first and second guide walls 13 and 14 in a radial direction with the center being the rotation axis O1. Radially outward or inward movement of the first pawl 31A along the first and second guide walls 13 and 14 engage or disengage the external teeth 44 and internal teeth 22.

On the other hand, the second and third pawls 31B and 31C are formed, for example, by pressing a steel plate. Unlike the first pawl 31A, each of the second and third pawls 31B and 31C does not have a second block 42, but has the shape of a flat plate with a structure similar to the first block 41. Specifically, the second and third pawls 31B and 31C, for lack of the second blocks 42, are shorter than the first pawl 31A in a radial direction and thinner than the first pawl 31A by an amount corresponding to the plate thickness of the second block 42. As with the first pawl 31A, each of the second and third pawls 31B and 31C has both widthwise ends 313 and 314 extending straight and parallel to each other. Each of the second and third pawls 31B and 31C has an arcuate outer edge. On the outer edge, a plurality of external teeth 47 is formed to mesh with the internal teeth 22 of the upper arm 20. Each of the second and third pawls 31B and 31C has an inner edge, on which an internal cam part 48 is formed to engage with the peripheral part of the cam 32. In the respective middles of the second and third pawls 31B and 31C, an engagement projection 49 is formed to project toward the recess 23 of the upper arm 20 along the rotation axis O1.

Both the ends 313 and 314 of each of the second and third pawls 31B and 31C are in slidable contact with the corresponding first guide wall 13 and second guide wall 14. The movement of each of the second and third pawls 31B and 31C is guided by the first and second guide walls 13 and 14 in a radial direction with the center being the rotation axis O1. Radially outward or inward movement of each of the second and third pawls 31B and 31C along the first and second guide walls 13 and 14 brings the external teeth 47 and internal teeth 22 into engagement or disengagement.

Figure 3A:
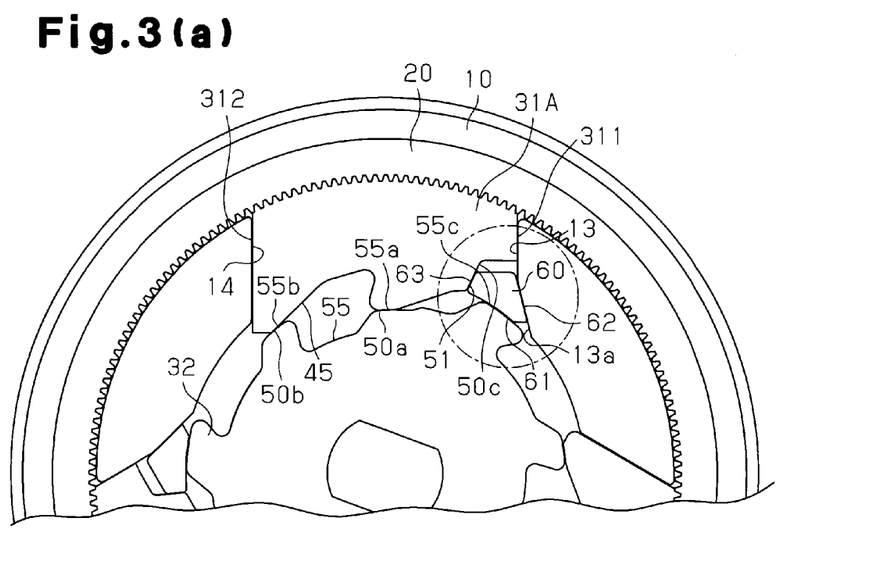
FIG. 3(a) is an enlarged view showing a meshed state of the seat reclining device according to the first embodiment.

The internal cam part 45 formed on the inner edge of the first block 41 of the first pawl 31A has three pawl-side cam faces 50a, 50b, and 50c, as shown in the enlarged view in FIG. 3(a). The pawl-side cam face 50a is formed in the middle of the internal cam part 45 in the circumferential direction. The pawl-side cam face 50b and the pawl-side cam face 50c are formed respectively at the front and the rear of the internal cam part 45 in the counterclockwise direction in FIG. 3. The pawl-side cam faces 50a, 50b, and 50c are opposite to the cam faces 55 of the peripheral parts of the cam 32. The pawl-side cam faces 50a and 50b have inclined surfaces configured to approach the corresponding peripheral parts of the cam 32 as the cam 32 rotates into the locking direction (the counterclockwise direction in FIG. 3). The pawl-side cam face 50c is configured to define a wedge-shaped space between with the inclined surface 13a of the corresponding first guide wall 13 opposite to it in the circumferential direction. The pawl-side cam face 50c has a pawl inclined surface 51 in which the radial inside of this cam face 50c deviates from the first guide wall 13 into the circumferential direction. Additionally, the inclined surface 13a of the first guide wall 13 is inclined such that the radial inside of the inclined surface 13a deviates from the first pawl 31A. Specifically, the space between the inclined surface 13a of the first guide wall 13 and the pawl inclined surface 51 narrows radially outward.

The internal cam parts 48 formed on the respective inner edges of the second and third pawls 31B and 31C have an identical shape to that of the internal cam part 45 of the first pawl 31A.

In the radially inward direction of the first to third pawls 31A to 31C arranged in the recess 21 of the upper arm 20, the cam 32 is arranged to be rotational in a locking direction and an unlocking direction around the rotation axis O1. In FIG. 1(a), the locking direction is indicated by a counterclockwise direction, whereas the unlocking direction is indicated by a clockwise direction.

The cam 32 is formed, for example, by pressing a steel plate and has the form of a flat plate. The cam 32 has three cam faces 55 at equal angular intervals on the peripheral part. Each cam face 55 includes three pressing cam parts 55a, 55b, and 55c respectively in the middle and on both sides in the circumferential direction.

The two pressing cam parts 55a and 55b of each of the cam faces 55 are capable of contacting the two pawl-side cam faces 50a and 50b of the corresponding first to third pawls 31A to 31C. The pressing cam parts 55a and 55b press the corresponding pawl-side cam faces 50a and 50b when the cam 32 is rotated into a locked position as shown in FIG. 1(a). On the other hand, the pressing cam part 55c of each of the cam faces 55 define a wedge-shaped space with the corresponding first guide wall 13 (inclined surface 13a) and the corresponding pawl-side cam face 50c of the first to third pawls 31A to 31C. A wedge-shaped pressing member 60 made of plate material is accommodated in the wedge-shaped space. Each pressing member 60 is sandwiched in the direction of the rotation axis O1 between the bottom face of the recess 11 of the lower arm 10 and the second block 42 of the first pawl 31A or the peripheral edge part of the release plate 33, and is movable in a radial direction while being in slidable contact with the pawl inclined surface 51 of the corresponding pawl-side cam face 50c and the inclined surface 13a of the corresponding first guide wall 13. Each pressing cam part 55c is capable of contacting the radially inner face 61 of the corresponding pressing member 60. The pressing cam part 55c presses the inner face 61 of the corresponding pressing member 60 when the cam is rotated into a locked position.

That is, the respective angular positions of the pressing cam parts 55a to 55c of the cam faces 55 are determined to press the pawl-side cam faces 50a and 50b of the corresponding first to third pawls 31A to 31C and the respective inner faces 61 of the corresponding pressing members 60.

Each pressing member 60 has pressing faces 62 and 63. The angle between the pressing faces 62 and 63 is substantially equal to the angle between the inclined surface 13a of the corresponding first guide wall 13 and the pawl inclined surface 51 of the corresponding pawl-side cam face 50c. When the inner face 61 of the pressing member 60 is pressed by the cam 32, the pressing faces 62 and 63 of the pressing member 60 come into firm contact with the inclined surface 13a and pawl inclined surface 51 respectively.

Figure 3B:
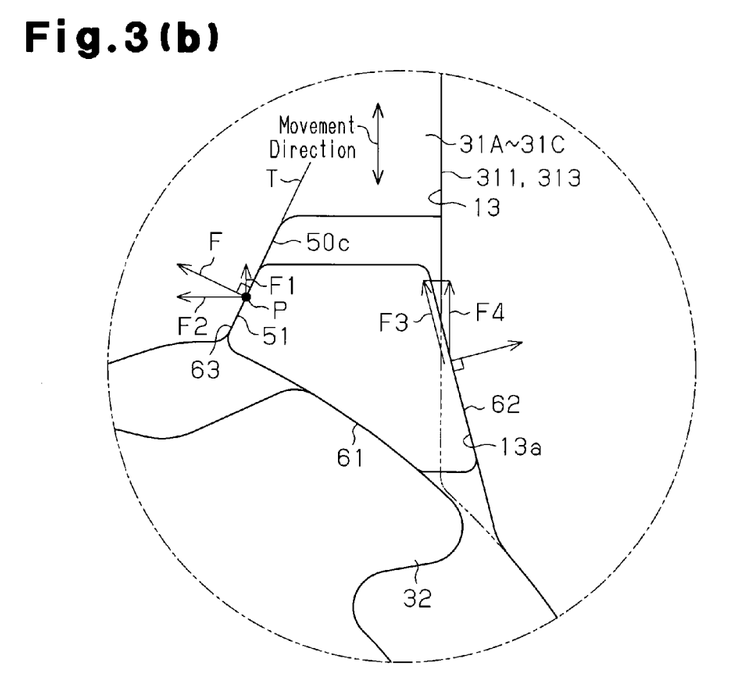
FIG. 3(b) is an explanatory view showing the meshed state.

At this time, as shown in the enlarged view in FIG. 3(b), the pressing force F of each pressing member 60 acting on the corresponding one of the first to third pawls 31A to 31C is oriented in a direction orthogonal to the tangent T of the corresponding one of the first to third pawls 31A to 31C at the pressing point P, that is, in the direction of the normal lines at the pressing point P. Therefore, the pressing force F of the pressing member 60 can be decomposed into: a first component force F1, which is a component in the moving direction of the corresponding one of the first to third pawls 31A to 31C (i.e., the components in the corresponding radial directions); and a second component force F2, which is a component in the widthwise direction of the corresponding pawl, which is a component in the direction orthogonal to the moving direction (i.e., the component in the circumferential direction). The first component force F1 moves the corresponding one of the first to third pawls 31A to 31C radially outward. The second component force F2 presses the corresponding one of the first to third pawls 31A to 31C in the circumferential direction such that the respective widthwise end 311 to 313 of the corresponding one of the first to third pawls 31A to 31C is separated from the first guide walls 13. That is, the pressing members 60 act as wedges. Accordingly, the spaces between the respective widthwise ends 312 and 314 of the first to third pawls 31A to 31C and the corresponding second guide walls 14 are filled.

In contrast, when the cam 32 is rotated in an unlocking direction, that is, in the clockwise direction in FIG. 3(a), the respective pressing cam parts 55a and 55b of the cam faces 55 are separated from the respective pawl-side cam faces 50a and 50b of the corresponding first to third pawls 31A to 31C, and the pressing cam parts 55c are separated from the inner faces 61 of the corresponding pressing members 60.

At this time, the pressing members 60 remain engaged between the corresponding pawl-side cam faces 50c and the corresponding inclined surfaces 13a by virtue of frictional forces with the respective cam faces 50c of the corresponding first to third pawls 31A to 31C and frictional forces with the respective inclined surfaces 13a of the corresponding first guide walls 13. However, as shown in FIG. 3(b), the respective component forces F4 of the frictional forces F3 between the pressing members 60 and the respective inclined surfaces 13a of the corresponding first guide walls 13, which are components in the respective moving directions of the corresponding first to third pawls 31A to 31C (i.e., the components in corresponding radial directions), are weakened compared to the frictional forces between the pressing members 60 and conventional guide walls in the respective moving directions of the corresponding first to third pawls 31A to 31C. That is, forces maintaining the engagements of the pressing members 60 are reduced. Thus, when the cam 32 is rotated in the unlocking direction, the pressing members 60 are prevented from remaining engaged between the respective pawl-side cam faces 50c of the corresponding first to third pawls 31A to 31C and the corresponding first guide walls 13.

On the face of the cam 32 opposite to the upper arm 20, a plurality of engagement projections 57 is interspatially formed in a circumferential direction to project toward the upper arm 20. One of the engagement projections 57 is inserted and engaged with the pawl-side groove cam part 46 of the first pawl 31A. The pawl-side groove cam part 46 and the engagement projection 57 act to move the first pawl 31A radially inward by rotation of the cam 32 in the unlocking direction (clockwise in FIG. 3).

The release plate 33 in the form of a thin plate is engaged with the engagement projections 57 and thereby integrally attached to the face of the cam 32 opposite to the bottom face of the recess 23 of the upper arm 20. The release plate 33 has a through hole 33a extending near and along the rotation axis O1. The release plate 33 is attached to the cam 32 to be located on the same plane as the second block 42 of the first pawl 31A. The release plate 33 is in slidable contact with the respective surfaces of the second and third pawls 31B and 31C opposite to the bottom face of the recess 23 of the upper arm 20. The release plate 33 is thinner than the second block 42 of the first pawl 31A. Therefore, the thickness of the second pawl 31B and release plate 33 and the thickness of the third pawl 31C and release plate 33 are less than the thickness of the first pawl 31A. The release plate 33 is formed from a substantially annular plate not to contact the projections 24 of the upper arm 20. A sectorial notch 33b is formed in a part of the annular plate of the release plate 33, and the first pawl 31A is arranged in the notch 33b. That is, the annular plate is notched in the shape of a sector only in the range of an angle corresponding to the first pawl 31A. Thus, the release plate 33 is prevented from interfering with the first pawl 31A when the cam 32 rotates.

The release plate 33 has two release-plate-side groove cam parts 59 on a circumference with the center being the rotation axis O1, which are formed through the release plate 33 in the direction of the rotation axis O1. These release-plate-side groove cam parts 59 are arranged further radially outward than the circumferential positions of the engagement projections 57. Engagement projections 49 projecting from the second and third pawls 31B and 31C are inserted into and engaged with the corresponding release-plate-side groove cam parts 59. The release-plate-side groove cam parts 59 are configured to move the second and third pawls 31B and 31C radially inward by being engaged with the engagement projections 49 when the release plate 33 is rotated into the unlocking direction (clockwise in FIG. 1(a)) together with the cam 32.

The spiral spring 34 urges the cam 32 in the direction in which the first to third pawls 31A to 31C are engaged with the upper arm 20. The spiral spring 34 is accommodated in the through hole 16 of the lower arm 10. As shown in FIG. 2, the spiral spring 34 is formed, for example, by winding a substantially rectangular flat linear material into a predetermined spiral shape, and is located between the lower arm 10 and cam 32. The spiral spring 34 has an outer end 34a locked in the locking groove 16a and an inner end 34b locked in a locking part, not shown, provided on the cam 32.

The cam 32 is configured to be urged by the spiral spring 34 onto the lower arm 10 in the locking direction (counterclockwise in FIG. 1(a)) to press the first to third pawls 31A to 31C radially outward by the cam faces 55, and thereby to engage the external teeth 44 and 47 with the internal teeth 22 of the upper arm 20.

Next, operations of the first embodiment will be described.

As shown in FIG. 1(a), in the locked state of the seat reclining device 1 for a vehicle, the cam 32 is urged counterclockwise by the spiral spring 34. Thereby, the cam parts 55a and 55b of the cam 32 respectively contact the pawl-side cam faces 50a and 50b of the respective internal cam parts 45 and 48 of the corresponding first to third pawls 31A to 31C. Additionally, the pressing cam parts 55c of the cam 32 contact the respective pawl-side cam faces 50c of the internal cam parts 45 and 48 of the corresponding first to third pawls 31A to 31C via pressing members 60. Thereby, the first to third pawls 31A to 31C are pressed radially outward. Consequently, the external teeth 44 and 47 of the first to third pawls 31A to 31C engage with the internal teeth 22 of the upper arm 20, thus restricting rotation of the upper arm 20 with respect to the lower arm 10. That is, rotating of the seat back 152 with respect to the seat cushion 151 is restricted (locked).

The pressing members 60 are accommodated between the respective pawl-side cam faces 50c of the corresponding first to third pawls 31A to 31C and the respective inclined surfaces 13a of the corresponding first guide walls 13. In the locked state of the seat reclining device 1 for a vehicle, the pressing cam parts 55c press the respective inner faces 61 of the corresponding pressing members 60. By the wedging actions of the pressing members 60 pressed radially outward, the respective widthwise ends 311 and 313 of the first to third pawls 31A to 31C are subjected to force in a circumferential direction to separate from the corresponding first guide walls 13. Consequently, while the lower arm 10 provided with the first guide walls 13 and the upper arm 20 engaged with the first to third pawls 31A to 31C rotate slightly relative to each other, the respective widthwise ends 312 and 314 of the first to third pawls 31A to 31C are pressed against the corresponding second guide walls 14. Thus, the gaps between the respective widthwise ends 312 and 314 of the first to third pawls 31A to 31C and the corresponding second guide walls 14 are removed. As a result, backlash of the seat back 152 with respect to the seat cushion 151 is prevented.

When the cam 32 and release plate 33 are rotated integrally in the unlocking direction against the urging force of the spiral spring 34 by operating the operation handle in this state, the pressing cam parts 55a and 55b of the cam 32 are separated from the respective pawl-side cam faces 50a and 50b of the internal cam parts 45 and 48 of the corresponding first to third pawls 31A to 31C. Additionally, the pressing cam parts 55c of the cam 32 come to separate from the corresponding pressing members 60, which thus stop pressing the pawl-side cam faces 50c of the internal cam parts 45 and 48 of the first to third pawls 31A to 31C via the pressing members 60. In addition, the pawl-side groove cam part 46 of the first pawl 31A and the corresponding engagement projection 57 of the cam 32 act in cooperation with each other such that the first pawl 31A approaches the rotation axis O1 along the first and second guide walls 13 and 14. Consequently, the external teeth 44 of the first pawl 31A and the internal teeth 22 are disengaged. Simultaneously, the respective engagement projections 49 of the second and third pawls 31B and 31C and the release-plate-side groove cam parts 59 act in cooperation with each other such that the second and third pawls 31B and 31C approach the rotation axis O1 along the first and second guide walls 13 and 14. Consequently, the external teeth 47 of the second and third pawls 31B and 31C and the internal teeth 22 are disengaged.

At this time, the frictional forces between these pressing members 60 and the inclined surfaces 13a of the corresponding first guide walls 13, which frictional forces hinder disengagement of the pressing members 60, are reduced in the manner described above. Accordingly, the pressing members 60 separated from the cam 32 are smoothly disengaged without remaining engaged between the pawl-side cam faces 50c (pawl inclined surfaces 51) of the corresponding first to third pawls 31A to 31C and the first guide walls 13 (inclined surfaces 13a). Also, the pawl-side cam faces 50c are released from pressure from the pressing members 60, allowing the first to third pawls 31A to 31C to move toward the rotation axis O1 (i.e., to move radially inward along the corresponding first and second guide walls 13 and 14). Consequently, the external teeth 44 and 47 of the first to third pawls 31A to 31C are smoothly disengaged from the internal teeth 22, thus allowing rotation of the upper arm 20 with respect to the lower arm 10. Specifically, rotating of the seat back 152 with respect to the seat cushion 151 is allowed (unlocked). Accordingly, the seat back 152 can be rotated to a position at any angle with respect to the seat cushion 151.

With the cam 32 kept unlocked, when the seat back 152 is rotated forward beyond the predetermined range of angle with respect to the seat cushion 151, that is, when the seat back 152 is rotated into the range of the forward leaning angle, the projections 24 formed on the second internal circumferential surface 23a of the recess 23 of the upper arm 20 are positioned between the internal teeth 22 and the engagement part 43 formed on the first pawl 31A. That is, engagement of the engagement part 43 of the first pawl 31A with the projections 24 of the upper arm 20 hinders radially outward movement of the first pawl 31A. When operating force applied by the operation handle is removed in this state, the cam 32 urged by the spiral spring 34 is moved in the direction in which the first pawl 31A is meshed with the internal teeth 22. However, since the projections 24 of the upper arm 20 engage with the engagement part 43 of the first pawl 31A, movement of the first pawl 31A is hindered until the external teeth 44 of the first pawl 31A mesh with the internal teeth 22. Simultaneously, in turn, thus hindered radial movement of the first pawl 31A hinders rotation of the cam 32. By virtue of this, the release plate 33 does not rotate, and the second and third pawls 31B and 31C are also held in the disengaged positions by the release-plate-side groove cam parts 59, where the external teeth 47 are separated from the internal teeth 22. Accordingly, the seat back 152 can be rotated freely within the range of the forward leaning angle without being locked.

By operating the operation handle, the seat back 152 can be returned backward to the position optimal for seating again, from the forward leaned state. When operating force applied by the operation handle is removed in that position, the first to the third pawls 31A to 31C, cam 32, and release plate 33 are brought back to the state shown in FIG. 1(a), and thus locked.

According to the first embodiment, as described in detail above, the advantages described below are obtained.

(1) In the first embodiment, the engagement projections 57 of the cam 32 engage with the corresponding first to third pawls 31A to 31C. This engagement, when the cam 32 is rotated counterclockwise against the urging force of the spiral spring 34, makes the first to third pawls 31A to 31C move radially inward along the corresponding first and second guide walls 13 and 14, causing the external teeth 44 and 47 to separate from the internal teeth 22. At this time, frictional forces occur between the pressing members 60 and the respective pawl-side cam faces 50c of the corresponding first to third pawls 31A to 31C and between these pressing members 60 and the respective inclined surfaces 13a of the corresponding first guide walls 13, which frictional forces hinder disengagement of the pressing members 60 from the pawl-side cam faces 50c and from the first guide walls 13. However, of the frictional forces between the pressing members 60 and the respective inclined surfaces 13a of the corresponding first guide walls 13, the component forces of the respective components in the respective moving directions of the first to third pawls 31A to 31C (i.e., the components in the corresponding radial directions) are weaker than those of the frictional forces between the pressing members 60 and the corresponding guide walls extending along the respective moving directions of the first to third pawls 31A to 31C. That is, the force maintaining the engagement of each pressing member 60 is reduced. Thus, the pressing members 60 released from the pressure of the cam 32 are prevented from being continuously engaged between the pawl-side cam faces 50c of the first to third pawls 31A to 31C and the inclined surfaces 13a of the first guide walls 13, and hence the pressing members 60 are smoothly disengaged. Accordingly, the pawl-side cam faces 50c are released from pressure from the pressing members 60, so that the first to third pawls 31A to 31C are allowed to move radially inward along the first and second guide walls 13 and 14. Additionally, the external teeth 44 and 47 and the internal teeth 22 are also disengaged smoothly from each other, thus allowing relative rotation of the lower and upper arms 10 and 20. That is, rotating of the seat back 152 with respect to the seat cushion 151 is allowed (unlocked).

As described above, when the external teeth 44 and 47 are engaged with the internal teeth 22, the component forces of the components in the respective widthwise directions (i.e., the components in the circumferential direction) of the first to third pawls 31A to 31C, which are applied by the corresponding pressing members 60 acting to hold the position of the internal teeth 22 against the external force, can be appropriately obtained. Also, when the cam is unlocked, engagement of the pressing members 60 with the pawl-side cam faces 50c and with the inclined surfaces 13a and engagement of the external teeth 44 and 47 and the internal teeth 22 can be released smoothly.

Second Embodiment

Next, a second embodiment of the present invention will be described with reference to FIGS. 4 to 6. In the second embodiment, the engagement structure of the cam and each of the pawls in the foregoing first embodiment is modified. Thus, like or the same reference numerals are given to those components that are like or the same as the corresponding components and detailed explanations are omitted.

Figure 4A:
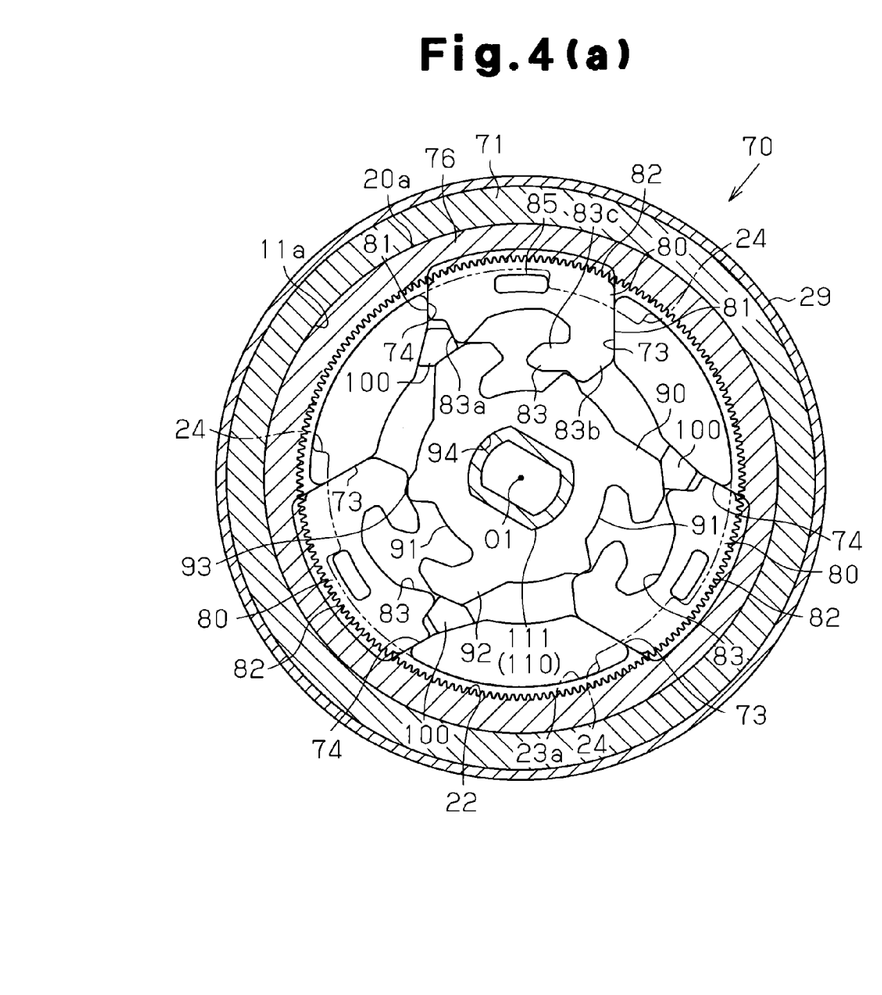
FIG. 4(a) is a transverse cross-sectional view of a seat reclining device according to a second embodiment.
Figure 4B:
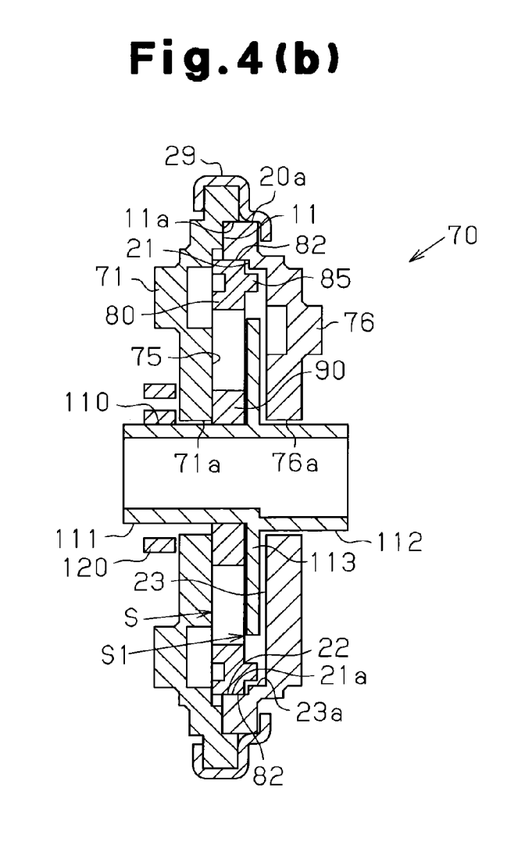
FIG. 4(b) is a longitudinal cross-sectional view of the seat reclining device according to the second embodiment.

As shown in FIGS. 4(a) and 4(b), a seat reclining device 70 for a vehicle according to the second embodiment includes: a disk-shaped lower arm 71 acting as a first arm; and a disk-shaped upper arm 76 acting as a second arm. At the respective central parts, the lower arm 71 and upper arm 76 have circular through holes 71a and 76a having the identical inner diameter and extending along a rotation axis O1.

Figure 5:
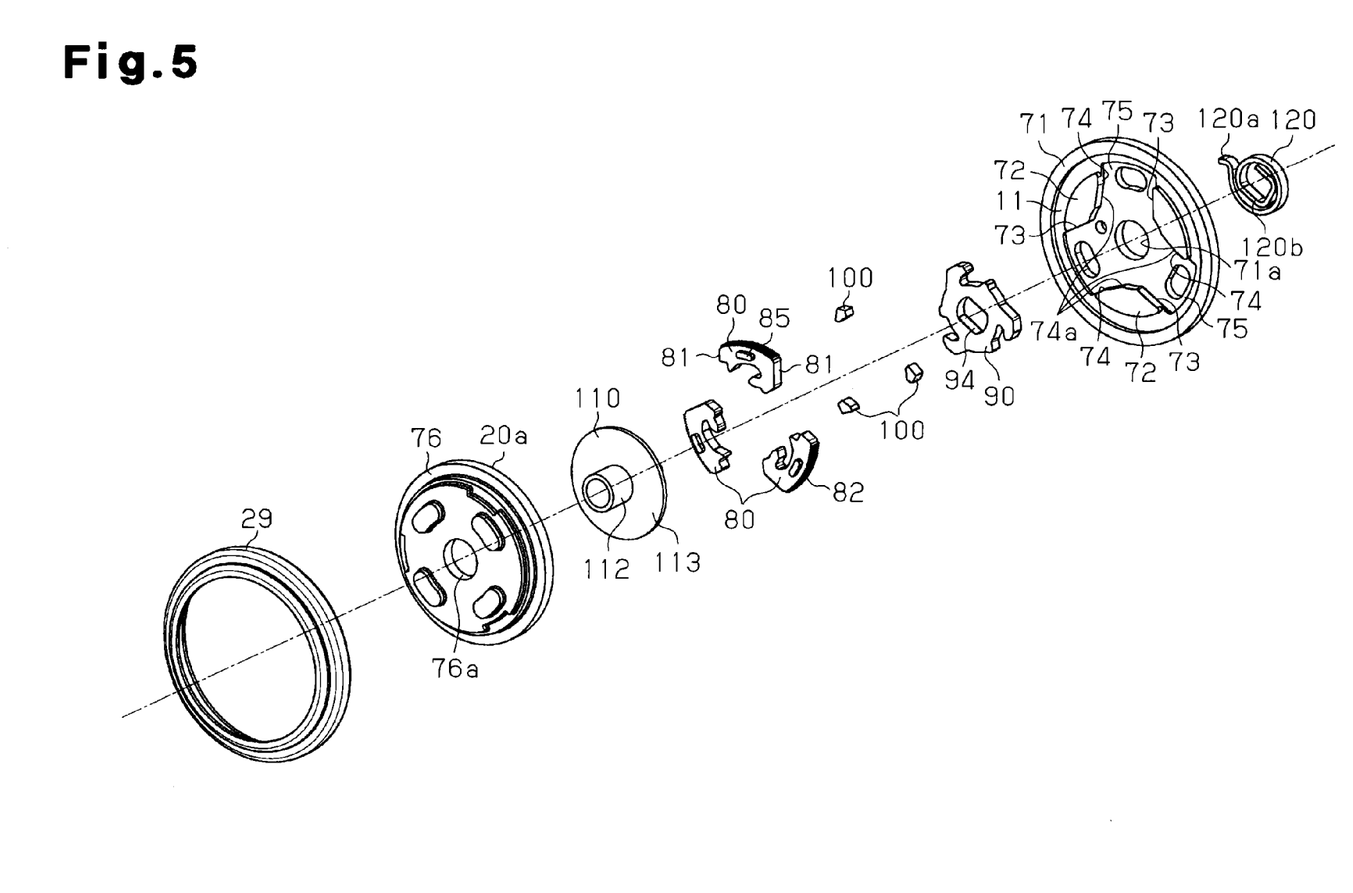
FIG. 5 is an exploded perspective view of a seat reclining device according to the second embodiment.

As shown in FIG. 5, on the bottom face of the recess 11 of the lower arm 71, three substantially sectorial projections 72 projecting toward the upper arm 76 along the rotation axis O1 are arranged at equal angular intervals along a circumferential direction. Each projection 72 has a first guide wall 73 and a second guide wall 74 on both sides in the circumferential direction. In FIG. 4(a), the first guide wall 73 is located at the front of each projection 72 in a counterclockwise direction, and a second guide wall 74 is located at the rear of each projection 72 in a counterclockwise direction. In each pair of adjacent projections 72, the first and second guide walls 73 and 74 are opposite to each other in the circumferential direction with the bottom face of the recess 11 in between, and extend parallel to each other in a radial direction with the center being the rotation axis O1. Together with the bottom of the recess 11, the first and second guide walls 73 and 74 form three substantially U-shaped guide grooves 75 at equal angular intervals along the circumferential direction to extend in a radial direction with the center being the rotation axis O1. These guide grooves 75 communicate with one another at the central part of the lower arm 10, and substantially exhibit a Y shape as a whole. The second guide wall 74 of each projection 72 has an inclined surface 74a at the radially inside part. The inclined surface 74a of the second guide wall 74 is inclined to deviate radially inward from the first guide wall 73 that is opposite to this second guide wall 74 with the bottom face of the recess 11 in between.

Three pawls 80 and a cam 90 are accommodated between the lower arm 71 and upper arm 76. The three pawls 80 are arranged at equal angular intervals in a circumferential direction within a plane orthogonal to the rotation axis O1.

Each pawl 80 is formed, for example, by pressing a steel plate, and has the shape of a flat plate, basically free from steps. Each pawl 80 has linear widthwise ends 81 parallel to each other. Both the widthwise ends 81 of each pawl 80 are in slidable contact with the first guide wall 73 and second guide wall 74 of the corresponding guide grooves 75. Each pawl 80 is mounted to move freely in a radial direction along the corresponding guide groove 75.

Each pawl 80 has an arcuate outer edge (an edge face opposite to the internal teeth 22 of the upper arm 76). The external edge of each pawl 80 has a plurality of external teeth 82 capable of meshing with the internal teeth 22. Accordingly, by moving each pawl 80 radially outward or inside along the corresponding first and second guide walls 73 and 74, the external teeth 82 and internal teeth 22 are brought into engagement or disengagement.

Figure 6A:
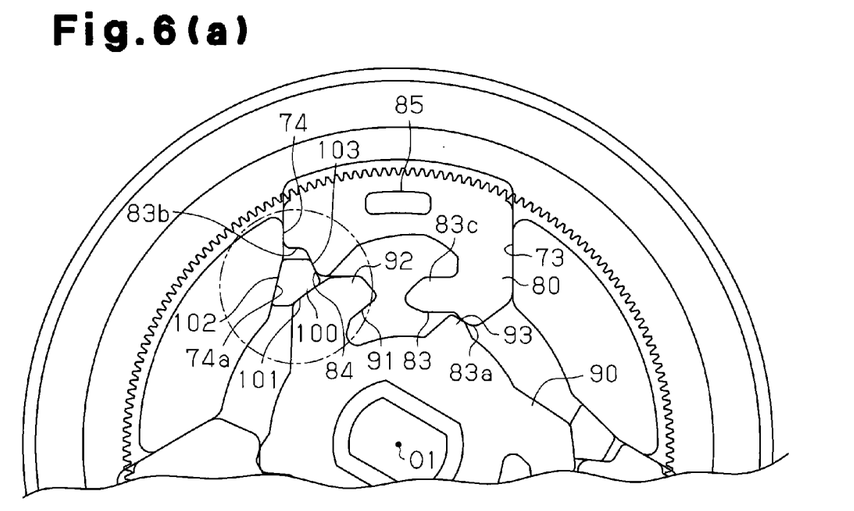
FIG. 6(a) is an enlarged diagram showing a meshed state of the seat reclining device according to the second embodiment.

As shown in the enlarged view FIG. 6(a), each pawl 80 has at its inner edge (an edge face opposite to the outer edge) an internal cam part 83 that engages with the peripheral part of the cam 90. An internal cam part 83 is formed from a pair of pawl-side cam faces 83a and 83b and a hooking part 83c. In FIG. 6(a), the pawl-side cam face 83a is formed at the front of the inner edge of the pawl 80 in the direction of counterclockwise rotation, whereas the pawl-side cam face 83b is formed at the rear of the inner edge of the pawl 80 in the direction of counterclockwise rotation. The inner edge of the pawl 80 having the pawl-side cam faces 83a and 83b substantially form a U shape. The hooking part 83c extends from the pawl-side cam face 83a toward the inside of this U shape. The pawl-side cam face 83b defines the wedge-shaped space with the inclined surface 74a of the second guide wall 74 opposite to the cam face 83b in a circumferential direction. The pawl-side cam face 83b has a pawl inclined surface 84 inclined to deviate from the second guide wall 74 in a circumferential direction, toward the radially inward direction. That is, the gap between the inclined surface 74a of the second guide wall 74 and the pawl inclined surface 84 narrows radially outward. Each pawl 80 has an arcuate engagement part 85 projecting toward the upper arm 76 along the rotation axis O1. The engagement part 85 is configured to be opposite to the second internal circumferential surface of the recess 23 in a radial direction.

The cam 90 is formed, for example, by pressing a steel plate, and has the shape of a flat plate. The cam 90 has a thickness along the rotation axis O1 sized to be arranged within the space where the guide grooves 75 of the lower arm 71 and the recess 21 (internal teeth 22) of the upper arm 76 are formed (i.e., the space where the pawls 80 are arranged). The cam 90 is arranged, within the space, to be rotational in locking and unlocking directions around the rotation axis O1. As shown in FIG. 4, in the central part of the cam 90, a cam fitting hole 94 of substantially oval shape is formed.

The cam 90 has in its periphery three cam faces 91 at equal angular intervals. Each cam face 91 is formed by a substantially triangular shoulder 93 and a hook 92, respectively arranged at the rear side and front side in the direction of locking rotation of the cam 90 in FIG. 6(a), that is, in the direction of counterclockwise rotation.

The shoulder 93 of each cam face 91 is capable of contacting the pawl-side cam face 83a of the corresponding pawl 80. When the cam 90 is rotated into the locked position, the shoulder 93 presses the pawl-side cam face 83a. On the other hand, the hook 92 of the cam face 91 defines a wedge shaped space between the pawl-side cam face 83b of the corresponding pawl 80 and the second guide wall 74 (inclined surface 74a). A wedge-shaped pressing member 100 made of a plate material is accommodated in the wedge-shaped space. Each pressing member 100 is in slidable contact with the pawl inclined surface 84 of the pawl-side cam face 83b and with the inclined surface 74a of the second guide wall 74 to be movable in a radial direction. The hook 92 is capable of contacting the radially inner face 101 of the corresponding pressing member 100. The hook 92 presses the inner face 101 of the pressing member 100 when the cam 90 is rotated into the locked position.

That is, the respective angular positions of the shoulder 93 and the hook 92 are determined such that when rotated into the locked position, the cam 90 contact (are pressed against) the pawl-side cam face 83a of the corresponding pawl 80 and the inner face 101 of the corresponding pressing member 100, respectively.

The pressing member 100 has pressing faces 102 and 103. The angle between the pressing faces 102 and 103 is substantially equal to the angle between the inclined surface 74a of the second guide wall 74 and the pawl inclined surface 84 of the pawl-side cam face 83b. When the inner face 101 of the pressing member 100 is pressed by the cam 90, the pressing faces 102 and 103 of the pressing member 100 are pressed against the inclined surface 74a and pawl inclined surface 84, respectively.

When rotated in the counterclockwise direction in FIG. 6(a), with the hook 92 and the shoulder 93, the cam 90 presses the inner face 101 of the corresponding pressing member 100 and the pawl-side cam face 83a of the corresponding pawl 80. Consequently, the corresponding pawl 80 is moved radially outward along the guide groove 75 of the lower arm 71. Accordingly, the external teeth 82 of the pawl 80 mesh with the internal teeth 22 of the upper arm 76. However, when the engagement part 85 of any pawl 80 is located radially opposite to one of the projections 24 of the upper arm 76, the engagement part 85 engages with the projections 24, thereby inhibiting the pawl 80 from moving until the external teeth 82 mesh with the internal teeth 22.

Figure 6B:
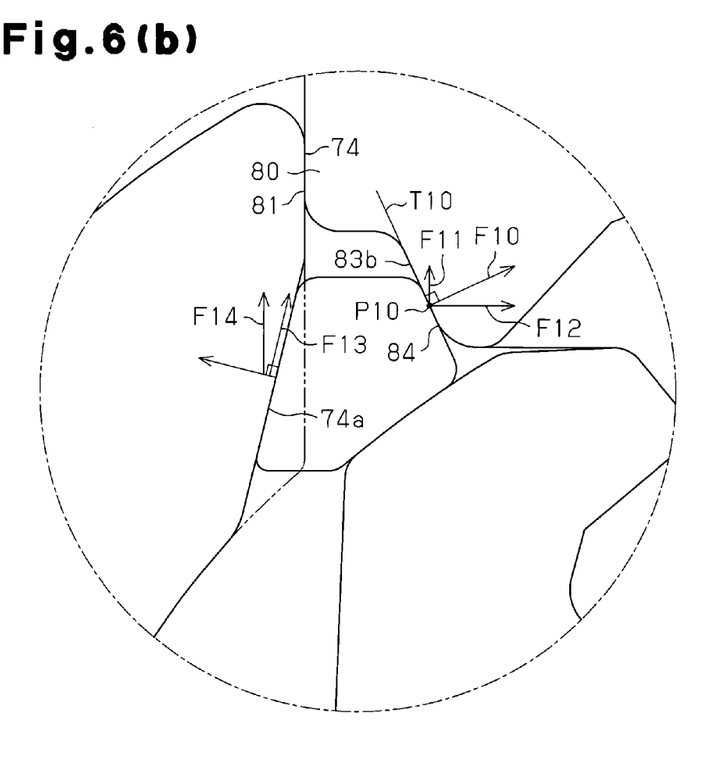
FIG. 6(b) is an explanatory view showing the meshed state.

At this time, as shown in the enlarged view in FIG. 6(b), the pressing force F10 of each pressing member 100 onto the corresponding pawl 80 is oriented in a direction orthogonal to the tangent T10 of the pawl 80 at the corresponding pressing point P10, that is, in the direction of the normal line at the pressing point P10. Therefore, the pressing force F10 of the pressing member 100 can be decomposed into: a first component force F11 of a component in the moving direction of the pawl 80 (i.e., the component in the radial direction); and a second force F12 of a component in the widthwise direction of the pawl 80, which is a component in a direction orthogonal to the moving direction (i.e., the components in the circumferential direction). The first component force F11 moves the pawls 80 radially outward. The second component force F12 presses the pawls 80 in the circumferential direction such that the widthwise end 81 of the pawl 80 near the second guide wall 74 separates from the second guide wall 74. That is, the pressing member 100 acts as a wedge. Accordingly, the space between the first guide wall 73 and the widthwise end 81 of the pawl 80 near the first guide wall 73 is filled.

When the pawls 80 are moved radially outward along the guide grooves 75 of the lower arm 71, if the engagement part 85 of any of the pawls 80 is located opposite to any of the projections 24 of the upper arm 76 in a radial direction, the radially outward movement of the pawls 80 is hindered and also rotation of the cam 90 is stopped. Accordingly, the respective external teeth 82 of the pawls 80 cannot be engaged with the internal teeth 22 of the upper arm 76.

As shown in FIG. 6(a), the cam 90 is configured such that when the cam 90 is rotated in the counterclockwise direction, each hook 92 of the cam 90 engages with the hooking part 83c of the corresponding pawl 80. By virtue of this engagement, the hook 92 is capable of pulling the pawl 80 radially inward along the corresponding guide grove 75 of the lower arm 71. Consequently, the external teeth 82 of the pawl 80 are moved to be disengaged from the internal teeth 22 of the upper arm 76. Simultaneously, the shoulder 93 is separated from the pawl-side cam face 83a of the corresponding pawl 80, and the hook 92 is separated from the inner face 101 of the corresponding pressing member 100.

At this time, the pressing members 100 remain engaged between the corresponding pawl-side cam faces 83b and the corresponding inclined surfaces 74a by virtue of frictional forces between these pressing members 100 and the respective cam faces 83b of the corresponding pawls 80 and the frictional forces between these pressing members 100 and the respective inclined surfaces 74a of the corresponding second guide walls 74. However, as shown in FIG. 6(b), by virtue of the inclinations of the inclined surfaces 74a, the respective component forces F14 of the frictional forces F13 between the pressing members 100 and the respective inclined surfaces 74a of the corresponding second guide walls 74, which are components in the respective moving directions of the corresponding pawls 80 (i.e., the components in the radial direction) are weakened compared to the frictional forces with conventional guide walls extending along the respective moving directions of the corresponding pawls 80. That is, forces maintaining engagement of the pressing members 100 are reduced. Thus, when the cam 90 is rotated in an unlocking direction, the pressing members 100 are prevented from being continuously engaged between the respective pawl-side cam faces 83b of the corresponding pawls 80 and the respective inclined surfaces 74a of the corresponding second guide walls 74.

A hinge cam 110 is fitted into the cam fitting hole 94 of the cam 90. That is, the hinge cam 110 extends along the rotation axis O1. The hinge cam 110 has: a first shaft part 111 extending through the through hole 71a of the lower arm 71 and supported by the lower arm 71 to freely rotate; a second shaft part 112 extending through the through hole 76a of the upper arm 76 and pivotally supported by the upper arm 76; and a flange part 113 accommodated in a space S1 formed in the recess 23 at a position further inside radially than the engagement part 85. The first shaft part 111 has a substantially oval cross-sectional shape. The first shaft part 111 of the hinge cam 110 fits in the cam fitting hole 94 of the cam 90. Thus, the cam 90 is coupled with the hinge cam 110 to rotate integrally with this cam 110. On the other hand, the second shaft part 112 has an external circumferential surface of an outer diameter identical to the inner diameter of the through hole 76a, and is in slidable contact with the through hole 76a. The flange part 113 is accommodated in a space S1 formed in the recess 23 and radially inside the engagement parts 85. Thus, movement of all the pawls 80 and cam 90 in the axial direction is restricted with the guide grooves 75 of the lower arm 71.

As shown in FIG. 5, a radially-outside leg part 120a of a spiral spring 120, serving as an urging member, is locked to the lower arm 71. A radially-inside leg part 120b of the spiral spring 120 is locked to the first shaft part 111 of the hinge cam 110. The spiral spring 120 urges the hinge cam 110 in the locking direction, thereby urging the cam 90. Thus, the pawls 80 are moved radially outward until the external teeth 82 engage with the internal teeth 22 or the engagement parts 85 come into contact with projections 24.

When subjected to force for unlocking applied by an operation member (not shown), the hinge cam 110 reversely rotates against the urging force of the spiral spring 120. At this time, the hinge cam 110 rotates the cam 90, and thereby moves the pawls 80 radially outward such that the external teeth 82 are separated from the internal teeth 22.

Next, operations in the second embodiment will be described.

As shown in FIG. 4(a), in the locked state of the seat reclining device 70 for a vehicle, the cam 90 is urged counterclockwise by the spiral spring 120. Thereby, the shoulders 93 of the cam 90 contact the pawl-side cam faces 83b of the respective internal cam parts 83 of the corresponding pawls 80. Additionally, the hooks 92 of the cam 90 contact the respective pawl-side cam faces 83a of the internal cam parts 83 of the corresponding pawls 80 via the pressing members 100. Thereby, the pawls 80 are pressed radially outward. Consequently, the external teeth 82 of the pawls 80 engage with the internal teeth 22 of the upper arm 76, thus restricting rotation of the upper arm 76 with respect to the lower arm 71. That is, rotation of the seat back 152 with respect to the seat cushion 151 is restricted (locked).

The pressing members 100 are accommodated between the respective pawl-side cam faces 83a of the corresponding pawls 80 and the corresponding second guide walls 74 (inclined surfaces 74a). In the locked state of the seat reclining device 70 for a vehicle, the hooks 92 press the respective inner faces 101 of the corresponding pressing members 100. By the wedging actions of the pressing members 100 pressed radially outward, the respective widthwise ends 81 of the pawls 80 are subjected to force in a circumferential direction to separate from the corresponding second guide walls 74. Consequently, while the lower arm 71 provided with the second guide walls 74 and the upper arm 76 engaged with the pawls 80 rotate slightly relative to each other, the respective widthwise ends 81 of the pawls 80 are pressed against the corresponding first guide walls 73. Thus, the gap between the respective widthwise ends 81 of the pawls 80 and the corresponding first guide walls 73 are removed. As a result, backlash of the seat back 152 with respect to the seat cushion 151 is prevented.

In this state, when the hinge cam 110 and the cam 90 are rotated integrally in the unlocking direction against the urging force of the spiral spring 120 by operating the operation handle, the shoulders 93 of the cam 90 separate from the respective pawl-side cam faces 83b of the internal cam parts 83 of the corresponding pawls 80. Additionally, the hooks 92 of the cam 90 separate from the corresponding pressing members 100 and thus stop the pressing members 100 pressing the pawl-side cam faces 83a of the internal cam parts 83 of the pawls 80. In addition, the hooking parts 83c of the pawls 80 and the corresponding hooks 92 of the cam 90 act in cooperation with each other such that pawls 80 approach the rotation axis O1 along the first and second guide walls 73 and 74. Consequently, the external teeth 82 of the pawls 80 and the internal teeth 22 are disengaged.

At this time, the frictional forces between with the inclined surfaces 74a of the corresponding second guide walls 74, which frictional forces hinder disengagement of the pressing members 100, are reduced in the manner described above. Accordingly, the pressing members 100 separated from the cam 90 are smoothly disengaged without remaining engaged between the pawl-side cam faces 83a (pawl inclined surfaces 84) of the corresponding pawls 80 and the second guide walls 74 (inclined surfaces 74a). Also, the pawl-side cam faces 83a are released from pressure by the pressing members 100, and the pawls 80 are allowed to move toward the rotation axis O1 (i.e., to move radially inward along the corresponding first and second guide walls 73 and 74). Consequently, the external teeth 82 of the pawls 80 are smoothly disengaged from the internal teeth 22, thus permitting rotation of the upper arm 76 with respect to the lower arm 71. Specifically, rotating of the seat back 152 with respect to the seat cushion 151 is allowed (unlocked). Accordingly, the seat back 152 can be rotated to any angle with respect to the seat cushion 151.

When the seat back 152 is rotated forward beyond the predetermined range of angle with respect to the seat cushion 151 with the seat reclining device 70 of the vehicle kept unlocked, that is, when the seat back 152 is titled into the range of the forward leaning angle, the projections 24 formed on the second internal circumferential surface 23a of the recess 23 of the upper arm 76 are positioned radially opposite to the engagement parts 85 formed in the pawls 80. That is, the engagement parts 85 of the pawls 80 engage with the projections 24 of the upper arm 76, thereby hindering radially outward movement of the pawls 80. When operating force for unlocking applied by an operation member is removed in this state, the shoulders 93 and hooks 92 of the cam 90 press the pawl-side cam faces 83b of the pawls 80 and the inner faces 101 of the pressing members 100, respectively, by virtue of the cam 90 urged in the counterclockwise direction by the spiral spring 120. However, since the projections 24 of the upper arm 76 engage with the engagement parts 85 of the pawls 80, movement of the pawls 80 is hindered until the external teeth 82 of the pawls 80 engage with the internal teeth 22 of the upper arm 76. Accordingly, the seat back 152 can be rotated freely without becoming locked, within the range of the forward leaning angle.

By applying operating force for unlocking to the operation member, the seat back 152 can be returned backward to the position optimal for seating again, from a forward leaned state. When operating force applied by the operation member is removed in that position, the pawls 80 and cam 90 are brought back to the state shown in FIG. 4(a), and thus locked.

In particular, since the flange part 113 of the hinge cam 110 is accommodated in the space S1 formed in the recess 23 at a position radially further inside than the engagement parts 85, this flange part 113 restricts axial movement of all the pawls 80 and cam 90. Accordingly, the pawls 80 and cam 90 are stably held to be arranged along the axis. Additionally, the hinge cam 110 is urged by the spiral spring 120 via the first shaft part 111. Furthermore, the first and second shaft parts 111 and 112 are supported by both the lower and upper arms 71 and 76. Accordingly, inclination of the hinge cam 110 is restricted.

According to the second embodiment, as described in detail above, advantages are obtained as in the first embodiment.

The first and second embodiments may be modified as described below.

In the first embodiment, the pressing member 60 may be provided in correspondence with at least one of the first to third pawls 31A to 31C.

In the first embodiment, the engagement part 43 may be provided in at least one of the first to third pawls 31A to 31C.

In the second embodiment, the pressing member 100 may be provided in correspondence with at least one of the three pawls 80.

In the second embodiment, the engagement part 85 may be provided in at least one of the three pawls 80.

In the first and second embodiments, two pressing members may be provided for each pawl.

In the first and second embodiments, the shape of the pressing members that are pressed against the inclined surfaces 13a, 74a, and the like may be, for example, cylindrical or spherical.

In the first and second embodiment, the upper arms 20 and 76 may include any number of projections 24.

In the first and second embodiments, any number of pawls may be provided in the lower arms 10 and 71. In a case where a plurality of pawls is provided, the shapes of these pawls may be different or the same as long as operation of these pawls is performed in conjunction with one another.

In the first and second embodiments, the lower arms 10 and 71 may be fixed to the seat back, and the upper arms 20 and 76 may be fixed to the seat cushion 151.

DESCRIPTION OF THE REFERENCE NUMERALS 1, 70 Seat reclining device for a vehicle
10, 71 Lower arm (First arm)
13, 73 First guide wall
14, 74 Second guide wall
13a, 74a Inclined surface
20, 76 Upper arm (Second arm)
22 Internal teeth
31A First pawl (Pawl)
31B Second pawl (Pawl)
31C Third pawl (Pawl)
Cam (Cam assembly)
Release plate (Cam assembly)
311 to 314, 81 Widthwise end
34, 120 Spiral spring (Urging member)
44, 47, 82 External teeth
60, 100 Pressing member
Pawl
90 Cam
151 Seat cushion
152 Seat back

The invention claimed is:

1. A seat reclining device for a vehicle, comprising:
a first arm fixed to one of a seat cushion and a seat back and having at least one pair of opposed guide walls;
a second arm fixed to the other of the seat cushion and the seat back, wherein the second arm is supported by the first arm to be rotational around a rotation axis and has a plurality of internal teeth formed to protrude inward in a radial direction with a center of the second arm being the rotation axis;
at least one pawl having a plurality of external teeth formed to protrude outward in the radial direction and capable of meshing with the internal teeth of the second arm, wherein the pawl is arranged between the opposed guide walls and is guided by the guide walls to move in the radial direction;
a cam assembly engaged with the pawl and selectively rotational in forward and reverse directions around the rotation axis, wherein when the cam assembly rotates in the forward direction, the cam assembly presses the pawl to move the pawl outward in the radial direction and to engage the external teeth of the pawl with the internal teeth of the second arm, and when the cam assembly rotates in the reverse direction, the cam assembly moves the pawl inward in the radial direction to separate the external teeth of the pawl from the internal teeth of the second arm;
at least one inclined surface formed in a radially inside area of at least one of the guide walls, wherein the inclined surface is inclined such that the radially inside area of the guide wall deviates from the pawl;
at least one pressing member arranged between the inclined surface and a radially inner face of the pawl, wherein when the cam assembly rotates in the forward direction, the pressing member is pressed outward in the radial direction by the cam assembly to press the radially inner face of the pawl, and in turn, presses the pawl in a direction from the guide wall that has the inclined surface toward the pawl, and moves the pawl outward in the radial direction, and when the cam assembly rotates in the reverse direction, the pressing member is released from pressure from the cam assembly to release pressure on the radially inner face of the pawl, and allows the pawl to move inward in the radial direction, wherein the pressing member is a separate member from the cam assembly, and wherein, when the external teeth are caused to separate from the internal teeth, of the frictional force between the pressing member and the inclined surface, a component force in a moving direction of the pawl is weaker than that of the frictional force between the pressing member and the guide wall extending along the moving direction of the pawl; and
an urging member configured to urge the cam assembly in the forward direction to move the pawl outward in the radial direction.

2. The seat reclining device for a vehicle according to claim 1, wherein the pressing member is arranged on only one of the opposed guide walls.

3. The seat reclining device for a vehicle according to claim 2, wherein
a part of the pawl pressed by the cam assembly is formed by a section of the radially inner face of the pawl that is pressed by the cam assembly via the pressing member, and one or two sections of the radially inner face of the pawl that are directly pressed by the cam assembly, and
the sections are spaced apart on the radially inner face of the pawl.

4. A seat reclining device for a vehicle, provided in a vehicle having a seat cushion and a seat back, comprising:
a first arm of a circular shape fixed to one of the seat cushion and the seat back and having a pair of opposite guide walls;
a second arm fixed to the other of the seat cushion and the seat back, wherein the second arm has first teeth and is supported by the first arm to freely rotate;
a pawl that has second teeth capable of engaging with the first teeth, is arranged between the guide walls, and is guided by the guide walls to move in a radial direction within the first arm;
a cam assembly supported to be rotational selectively in forward and reverse directions with respect to the second arm, wherein the cam assembly is engaged with the pawl, and wherein when the cam assembly rotates in the forward direction, the cam assembly moves the pawl in the radial direction such that the first teeth engage with the second teeth, and when the cam assembly rotates in the reverse direction, the cam assembly moves the pawl in the radial direction such that the first teeth separate from the second teeth;
an inclined surface formed on one of the guide walls at a position radially inside the first arm, wherein the inclined surface is inclined to deviate from the pawl from the radially outside toward the radially inside on the first arm; and
a pressing member arranged between the inclined surface and the pawl, wherein when the cam assembly rotates in the forward direction, the pressing member is pressed by the cam assembly to press a face of the pawl, and the pawl is moved along the pair of guide walls while being pressed against the guide walls by the pressing member, and when the cam assembly rotates in the reverse direction, the pressing member is released from pressure from the cam assembly to release pressure from the pressing member on the face of the pawl and to allow the pawl to move inward in the radial direction along the pair of guide walls, wherein the pressing member is a separate member from the cam assembly, and wherein, when the second teeth are caused to separate from the first teeth, of the frictional force between the pressing member and the inclined surface, a component force in a moving direction of the pawl is weaker than that of the frictional force between the pressing member and the guide wall extending along the moving direction of the pawl.

* * * * *